(12) United States Patent
Dhakal et al.

(10) Patent No.: US 9,231,677 B2
(45) Date of Patent: Jan. 5, 2016

(54) SPARSE CODES FOR MIMO CHANNEL AND DETECTOR ALTERNATIVES FOR SPARSE CODE

(71) Applicant: RESEARCH IN MOTION LIMITED, Waterloo (CA)

(72) Inventors: Sagar Dhakal, Irving, TX (US); Alireza Bayesteh, Kitchener (CA); Steve Hranilovic, Oakville (CA); Amin Mobasher, Waterloo (CA); Thomas Aloysius Sexton, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/790,011

(22) Filed: Mar. 8, 2013

(65) Prior Publication Data

US 2013/0182791 A1    Jul. 18, 2013

Related U.S. Application Data

(63) Continuation of application No. PCT/US2011/055361, filed on Oct. 7, 2011.

(60) Provisional application No. 61/390,815, filed on Oct. 7, 2010.

(51) Int. Cl.
*H04L 27/00* (2006.01)
*H04B 7/04* (2006.01)
*H04L 1/06* (2006.01)

(52) U.S. Cl.
CPC ............ *H04B 7/0456* (2013.01); *H04L 1/0618* (2013.01)

(58) Field of Classification Search
CPC .. H04B 7/0456; H04L 1/0618; H04L 1/0003; H04L 1/0071; H04L 5/0007; H04L 1/0009; H04L 27/0008
USPC .......................................... 375/295, 219, 316
See application file for complete search history.

(56) References Cited

U.S. PATENT DOCUMENTS

2007/0025467 A1     2/2007  Li
2012/0002742 A1*    1/2012  Cheng ........................ 375/267

FOREIGN PATENT DOCUMENTS

| CN | 101151815 A | 3/2008 |
| WO | 2006086576 A2 | 8/2006 |
| WO | 2006091620 A2 | 8/2006 |
| WO | 2010069098 A1 | 6/2010 |
| WO | 2012048218 A1 | 4/2012 |

OTHER PUBLICATIONS

Vahid Tarokh, Hamid Jafarkhani, A. R. Calderbank, Space-Time Block Codes from Orthogonal Designs, Jul. 1999, IEEE vol. 45, No. 5 p. 1456-1467.*

(Continued)

*Primary Examiner* — Zewdu Kassa
(74) *Attorney, Agent, or Firm* — Conley Rose, P.C.; J. Robert Brown, Jr.

(57) ABSTRACT

Embodiments are disclosed for improved systems and methods for encoding and decoding information transmitted using multiple-input-multiple-output (MIMO) communication devices. Structurally sparse codes are implemented based on principles of compressive sampling. Improved detectors are also disclosed for implementing basis pursuit and basis pursuit with runner-up detection techniques.

12 Claims, 5 Drawing Sheets

(56) References Cited

OTHER PUBLICATIONS

Dhakal et al., "Sparse Space Codes for Multi-Antenna Systems", Information Theory (CWIT), 2011, 12th Canadian Workshop, IEEE, pp. 159-164.
International Search Report and Written Opinion for PCT Application No. PCT/US2011/055361, dated Dec. 27, 2011, pp. 1-10.
International Preliminary Report on Patentability for PCT Application No. PCT/US2011/055361, dated Apr. 18, 2013, pp. 1-7.
Alamouti, Siavash M.; "A Simple Transmit Diversity Technique for Wireless Communications"; IEEE Journal on Select Areas in Communications; vol. 16; No. 8; Oct. 1998; 8 pages.
Ganesan, Girish, et al.; "Space-Time Block Codes: A Maximum SNR Approach"; IEEE Transactions on Information Theory; vol. 47; No. 4; May 2001; 7 pages.
Zhu, Hao, et al.; "Sparsity-Embracing Multiuser Detection for CDMA Systems with Low Activity Factor"; IEEE; 2009; 5 pages.
Candes, Emmanuel J., et al.; "Robust Uncertainty Principles: Exact Signal Reconstruction From Highly Incomplete Frequency Information"; IEEE Transactions on Information Theory; vol. 52; No. 2; Feb. 2006; 21 pages.
Tarokh, Vahid, et al.; "Space-Time Block Codes from Orthogonal Designs"; IEEE Transactions on Information Theory; vol. 45; No. 5; Jul. 1999; 12 pages.
Baraniuk, Richard G.; "Compressive Sensing"; IEEE Signal Processing Magazine; Jul. 2007; 4 pages.
Donoho, David L.; "Compressed Sensing"; IEEE; Apr. 2006; 34 pages.
Berger, Christian R., et al.; "Signal Extraction Using Compressed Sensing for Passive Radar with OFDM Signals"; IEEE; 2008; 6 pages.
Efron, Bradley, et al.; "Least Angle Regression"; The Annuals of Statistics; vol. 32; No. 2; 2004; 93 pages.
Candes, Emmanuel J., et al.; "An Introduction to Compressive Sampling"; IEEE Signal Processing Magazine; Mar. 2008; 10 pages.
Canadian Office Action; Application No. 2,813,769; Nov. 27, 2014; 3 pages.
European Examination Report; Application No. 11774139.7; Aug. 12, 2014; 3 pages.
Chinese Office Action; Application No. 201180059068.1; Mar. 2, 2015; 11 pages.

\* cited by examiner

SPARSE CODES FOR MIMO CHANNEL AND DETECTOR ALTERNATIVES FOR SPARSE CODE

CROSS-REFERENCE TO RELATED APPLICATION

This application is a continuation application of International Application No. PCT/US11/55361, filed Oct. 7, 2011 which claims the benefit under 35 U.S.C. §119(e) of U.S. Provisional Application No. 61/390,815, filed Oct. 7, 2010. The present application incorporates both International Application No. PCT/US11/55361 and U.S. Provisional Application No. 61/390,815 by reference in their entirety.

BACKGROUND OF THE DISCLOSURE

1. Field of the Disclosure

The present disclosure is directed in general to communication systems and methods for operating same. More particularly, embodiments of the disclosure provide improved systems and methods for encoding and decoding information transmitted using multiple-input-multiple-output (MIMO) communication devices.

2. Description of the Related Art

Orthogonal space-time block codes (OSTBC) have traditionally been used to achieve a full diversity gain in MIMO communication channels. Maximum likelihood decoding for OSTBC requires linear processing of the received signals. As is known to those of skill in the art, the Alamouti code is an effective OSTBC for channel with two transmit antennas. Alamouti codes can transmit two independent symbols from two antennas in two symbol durations using the code structure shown below in Matrix 1.

$$\begin{pmatrix} a_1 & -a_2^* \\ a_2 & a_1^* \end{pmatrix} \quad \text{Matrix 1}$$

In the above symbol structure symbols $a_1$ and $a_2$ are transmitted from transmit antenna Tx1 and Tx2, respectively, during the first symbol time, and symbols $-a_2^*$ and $a_1^*$ transmitted from transmit antennas Tx1 and Tx2, respectively, during the second symbol time. The information rate of Alamouti code is $\log_2|A|$ A bits per transmission when symbols i and belong to constellation sets A and $|A|$ is the number of elements in set A. The detection decision is made only after processing signals received over two symbol times, resulting in a two symbol time decoding delay.

For a large number of transmit antennas, OSTBC code structures are complex and are not able to achieve a full information rate. One well known OSTBC for four (referred to herein as OSTBC-4) transmit antennas has the code structure shown below in Matrix 2.

$$\begin{pmatrix} a_1 & -a_2^* & -a_3^* & 0 \\ a_2 & a_1^* & 0 & -a_3^* \\ a_3 & 0 & a_1^* & a_2^* \\ 0 & a_3 & -a_2 & a_1 \end{pmatrix} \quad \text{Matrix 2}$$

In the above code, four symbol periods are required to transmit three symbols, thus requiring an information rate of $$\frac{3}{4}\log_2|A|$$

bits per transmission. Another drawback of the code shown in Matrix 2 is that the channel should remain constant for four symbol blocks and, therefore, the code may have limited applicability in high Doppler channels. Furthermore, the decoding delay for the code structure shown in Matrix 2 is also of four symbol periods.

Current encoders and detectors for implementing the coding discussed above in Matrix 1 and Matrix 2 is comparatively processor intensive and result in significant decoding delay. It would be desirable, therefore, to implement a code structure that provides a high degree of accuracy while minimizing the use of processor resources and also minimizing decoding delay. Improved systems and methods for encoding and decoding information transmitted using multiple-input-multiple-output (MIMO) communication devices to meet the aforementioned needs are disclosed herein.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers, Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, LTE, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Figure 1:
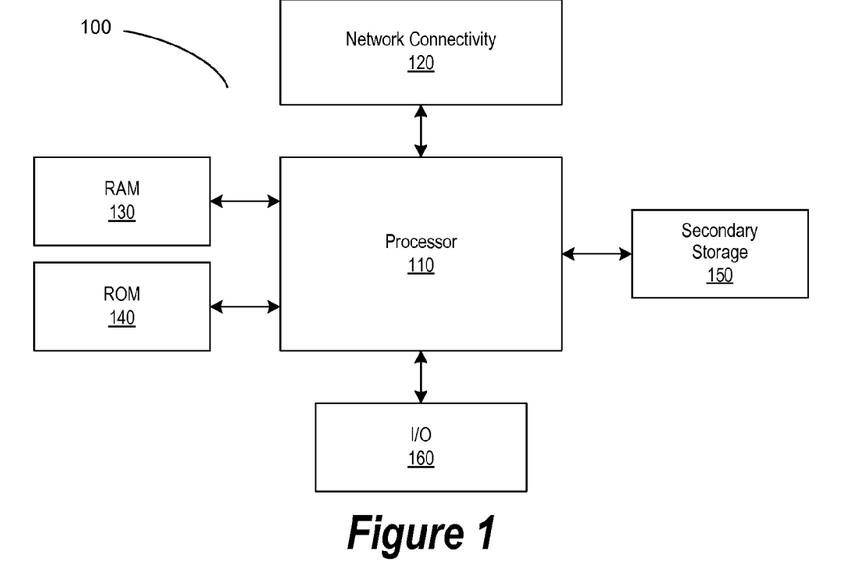
FIG. 1 depicts an exemplary system in which the present disclosure may be implemented.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
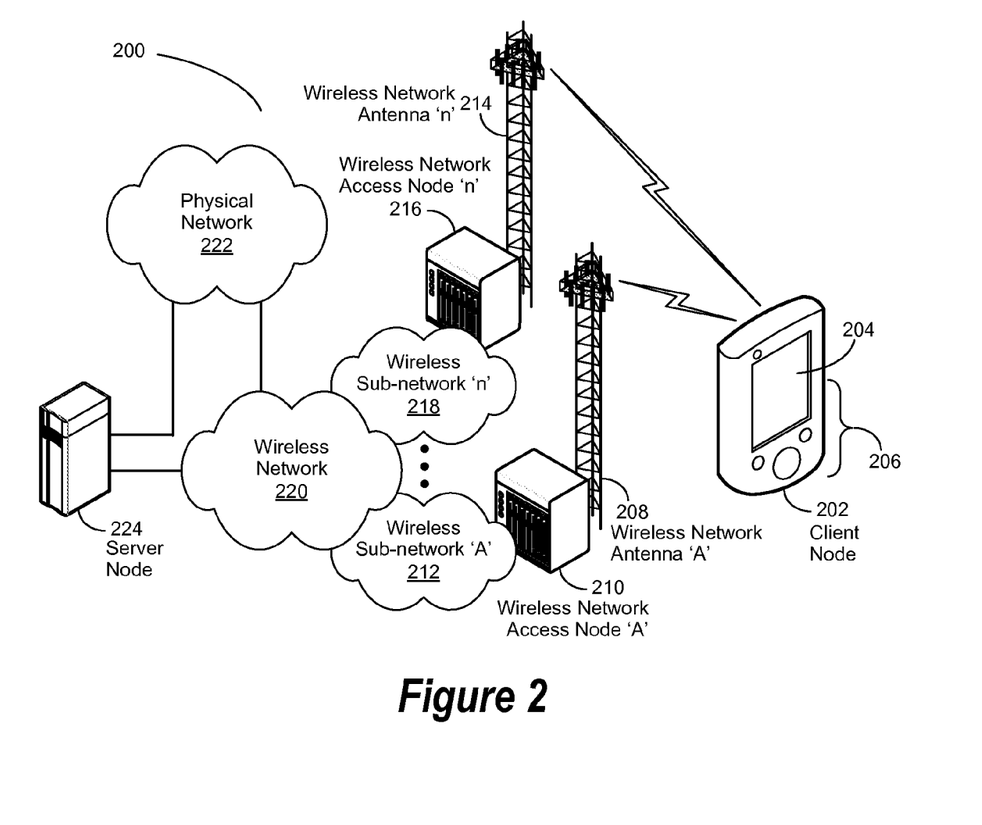
FIG. 2 shows a wireless-enabled communications environment including an embodiment of a client node.

FIG. 2 shows a wireless-enabled communications environment including an embodiment of a client node as implemented in an embodiment of the disclosure. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In various embodiments described hereinbelow, an access node may use multiple antennas simultaneously to transmit data to a client node that uses multiple antennas simultaneously to receive the data. In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless network 220. Skilled practitioners of the art will recognize that many such embodiments are possible and the foregoing is not intended to limit the spirit, scope, or intention of the disclosure.

Figure 3:
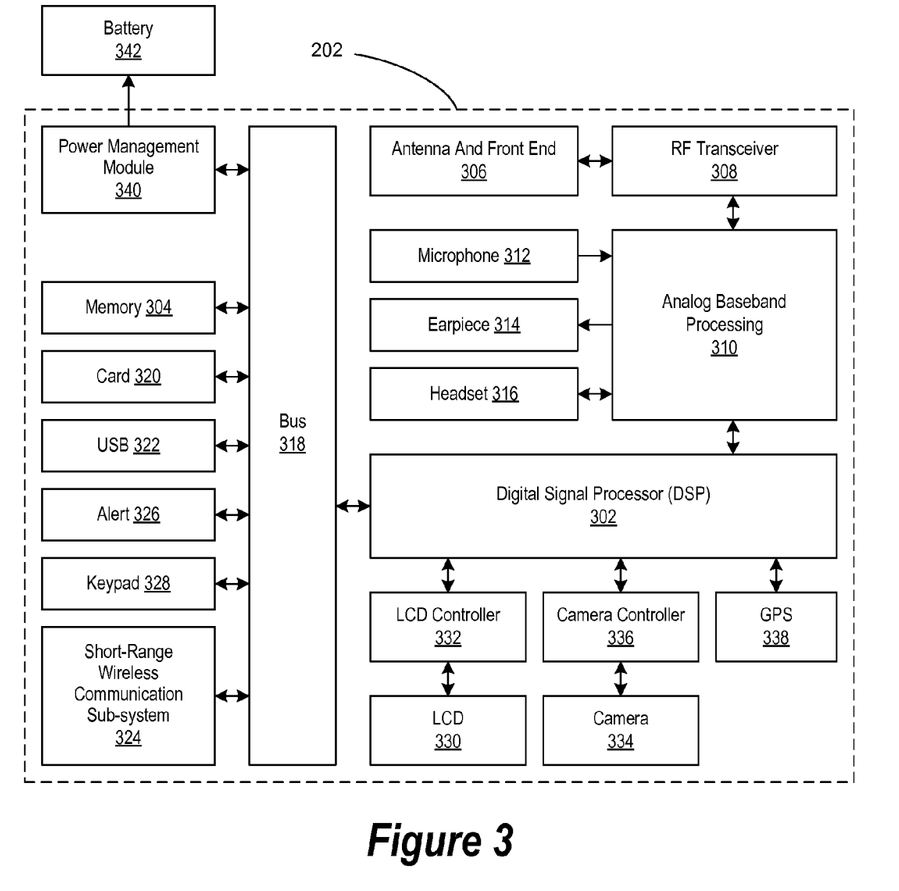
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the disclosure. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 308, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. Various other peripherals may also be included to provide additional functions, such as radio and television reception.

Figure 4:
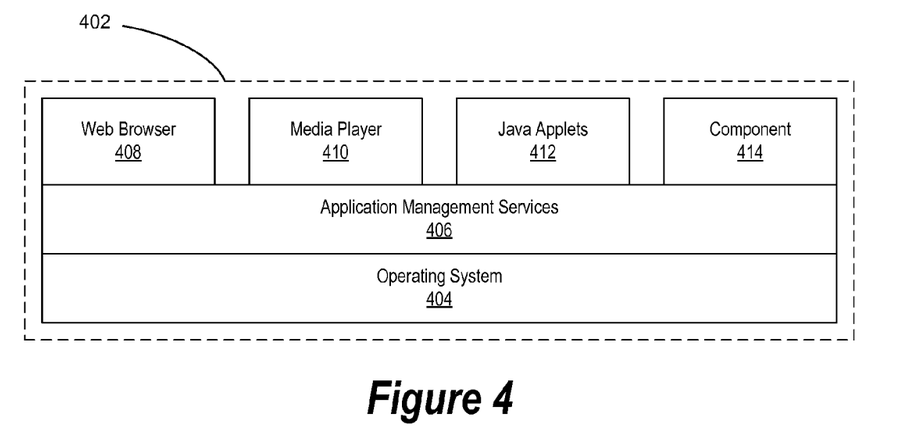
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A component 414 may provide functionality described herein. In various embodiments, the client node 202, the wireless network nodes 'A' 210 through 'n' 216, and the server node 224 shown in FIG. 2 may likewise include a processing component that is capable of executing instructions related to the actions described above.

Figure 5:
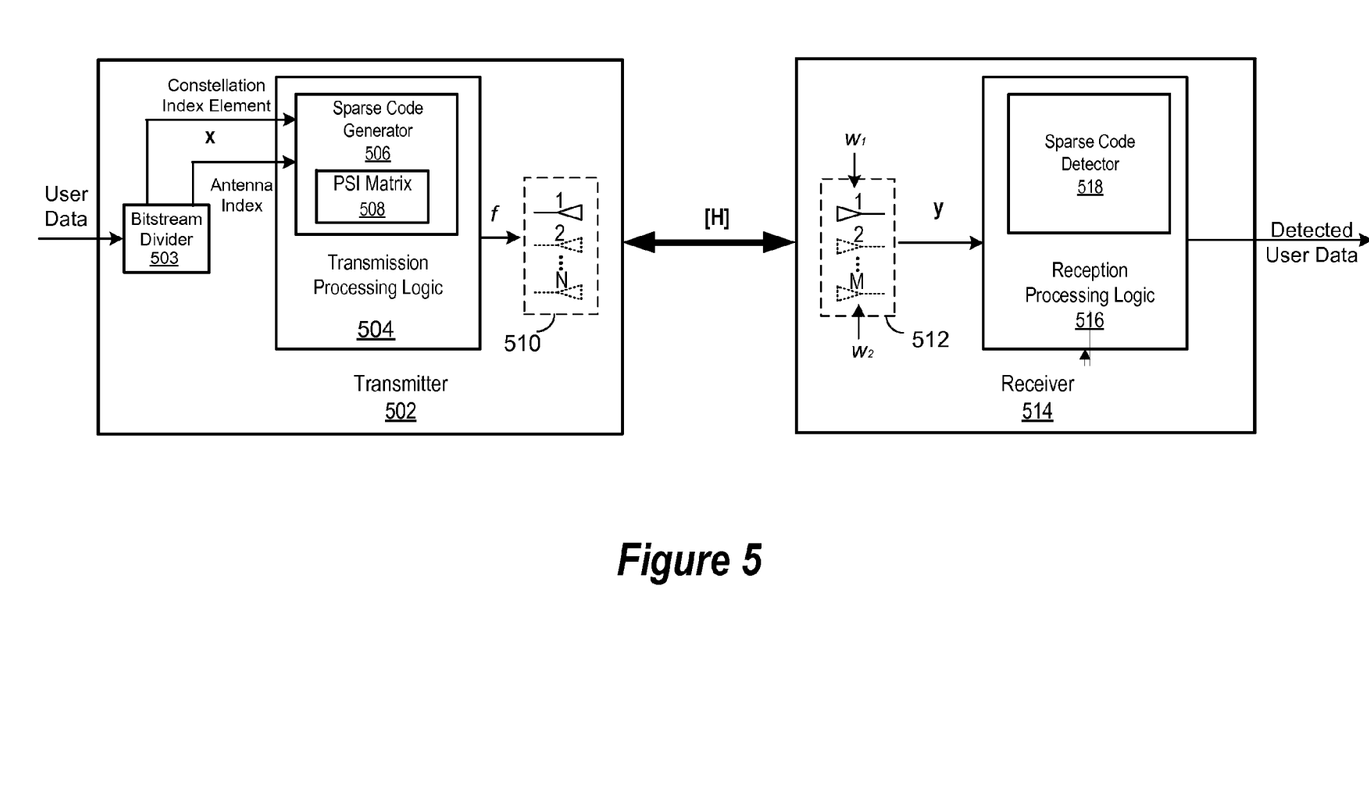
FIG. 5 is a block diagram illustration of an access node and a client node configured for sparse code transmission in a MIMO channel.

FIG. 5 is an illustration of an embodiment of a communication system using alternative embodiments of the communication components discussed above in connection with FIGS. 1-4. In the embodiment shown in FIG. 5, a user data bit stream is received by transmitter node 502 and is processed by a bit stream divider 503 to generate an antenna index bit stream and a constellation element index bit stream. These two bit streams are then processed transmission processing logic 504 comprising a sparse code generator 506 that is operable to use process the antenna index bit stream and the constellation index element bitstream using a PSI matrix 508 to generate a signal vector f for transmission over a plurality of antennas 510. The signal vector f is transmitted through free space through channel matrix [H] and is received by a plurality of antennas 512 in the receiver 514. The receiver 514 has no prior knowledge of f. The received incoming signal is received as a signal vectory that is processed by reception processing logic 516 to generate detected user data. More specifically, the receiver processing logic 516 comprises a sparse code detector 518 that is operable to process the incoming signal vectory, in accordance with the processing steps discussed hereinbelow, using the relationship y=[H]f+w, where w is Gaussian noise detected by the plurality of antennas 512.

Multiple embodiments will now be disclosed for encoding and decoding communication signals in the various embodiments of communication systems discussed above. More specifically, the embodiments disclosed herein are implemented using sparse coding techniques. To illustrate the techniques implemented in embodiments of the disclosure, consideration will first be given to a complex signal vector $f \in C^n$ that has s non-zero components when spanned under the $\Psi \in C^{n \times n}$ basis. Those skilled in the art will appreciate that a sparse-coded signal, i.e., s-sparse, can be represented by the relationship:

$$f = \Psi x, \quad (1)$$

where x is the s-sparse version of f. From compressive sampling theory, it is known that f can be precisely reconstructed by measuring only $$m \geq K s \log\left(\frac{n}{s}\right)$$

random linear combinations of elements of f with K a small constant. More specifically, the measurement $y \in C^m$ is $$y = \Phi f, \quad (2)$$

where $\Phi \in C^{m \times n}$ is the random measurement (or sub-sampler) matrix and m<<n. Under the condition that sub-sampler $\Phi$ is incoherent to basis $\Psi$, perfect reconstruction of the n-dimensional signal f from the m-dimensional observation y can be achieved through convex optimization. The embodiments disclosed herein implement compressive sampling techniques to provide sparse codes for transmitting information in an under-determined multiple-input multiple-output (MIMO) channel.

A MIMO signal with m receive antennas and n>m transmit antennas can be represented by the following relationship:

$$y = Hf + w, \quad (3)$$

where f is the transmit signal, H is the iid complex Gaussian channel, w is the complex Gaussian white noise, and y is the received signal. Those of skill in the art will appreciate that the channel H in Eq. (3) is analogous to the random sampler $\Phi$ in Eq. (2). Further, as the wireless channel is random Gaussian, with high probability, H is always incoherent to any orthonormal basis $\Psi$. Therefore, if the transmit signal f is sparse under $\Psi$, then f can be constructed from y by implementing compressive sampling. This is accomplished by constructing a sparse code x and selecting an orthonormal basis $\Psi$ that spans the transmit signal f using Eq. (1). Then, the receiver with the knowledge of H and Ψ can detect x by observing y. It is to be noted that the difference between Eqs. (2) and (3) is the presence of AWGN component in Eq. (3) that lowers the detection probability.

A sparse codebook is defined by: (i) a collection of s-sparse code vectors x, (ii) a basis matrix Ψ and (iii) an alphabet constellation $\mathcal{A}$. The non-zero elements of x belong to $\mathcal{A}$. Let C(s, Ψ, $\mathcal{A}$) denote such a codebook. The total number of code words in C(s, Ψ, $\mathcal{A}$) is given by the product $$\frac{n!}{(n-s)!s!}|\mathcal{A}|^s,$$

where $$\binom{n}{s}$$

term represents the possibilities of uniquely positioning s non-zero elements in any vector of size n, and $|\mathcal{A}|^s$ represents the possibilities of assigning unique symbols from constellation of cardinality $|\mathcal{A}|$. Therefore, the entropy is given by $$h(C(s, \Psi, \mathcal{A})) = \log_2\left(\frac{n!}{(n-s)!s!}\right) + s\log_2(|\mathcal{A}|) \quad (4)$$

It is also an upper-bound of the mutual information between f and y in Eq. (3). Clearly, code sparsity increases information content per code by inserting uncertainty in the position of non-zero elements of the code. A sparse code detector should not only detect the correct transmitted constellation symbols but also the position of the symbols in x. Theory of compressive sampling guarantees existence of such detectors; thereby enabling use of proposed high entropy sparse codes as alternative to OSTBC.

Having discussed sparse codes generally, the design and performance of 1-sparse codes will now be disclosed. Specifically, the following discussion will relate to a MIMO channel with n=4 transmit antennas and m=2 receive antennas. For s=1, a 1-Sparse codebook C(1, Ψ, $\mathcal{A}$) has the following structure:

$$\begin{pmatrix}a\\0\\0\\0\end{pmatrix}, \begin{pmatrix}0\\a\\0\\0\end{pmatrix}, \begin{pmatrix}0\\0\\a\\0\end{pmatrix}, \text{and} \begin{pmatrix}0\\0\\0\\a\end{pmatrix} \text{ for all } a \in \mathcal{A}. \quad (5)$$

For example if $\mathcal{A}$ is a QPSK constellation, then the following set consists of sixteen 1-Sparse code words given as:

$$\left\{\begin{pmatrix}\pm e^{\pm i\frac{\pi}{4}}\\0\\0\\0\end{pmatrix}, \begin{pmatrix}0\\\pm e^{\pm i\frac{\pi}{4}}\\0\\0\end{pmatrix}, \begin{pmatrix}0\\0\\\pm e^{\pm i\frac{\pi}{4}}\\0\end{pmatrix}, \begin{pmatrix}0\\0\\0\\\pm e^{\pm i\frac{\pi}{4}}\end{pmatrix}\right\} \quad (6)$$

All code words are equally likely to occur, and x provides four bits of entropy per transmission. The code words are transformed using Ψ to obtain the signal f that is transmitted over the channel $$H = \begin{pmatrix}h_{11} & h_{12} & h_{13} & h_{14}\\h_{21} & h_{22} & h_{23} & h_{24}\end{pmatrix}. \quad (7)$$

Two types of basis functionals are used:
(a) Identity basis Ψ=I: In this representation, f=x, resulting in f having three zeros and one non-zero element. Only one power amplifier for the transmit antenna corresponding to the non-zero elements of f needs to be turned on; and
(b) Fourier basis $$\Psi = \mathcal{F} = \left\{\frac{1}{2}e^{-i\pi kl/2}\right\}k, l = 0, \ldots, 3:$$

Under this transformation all the elements of f are non-zero and, therefore, all four transmit antennas radiate energy in each symbol position. For example if $$x = \begin{pmatrix}a\\0\\0\\0\end{pmatrix},$$

then f is the first column of $\mathcal{F}$ scaled by symbol a.

In the various embodiments of the disclosure, it is assumed that receiver knows the perfect channel information. A maximum likelihood (ML) detector can be used for OSTBC as well as sparse code detection. In ML detection an exhaustive search is performed within the codebook to find a code that is closest in the L2-space to the received signal. Detection for the Alamouti code requires a delay of two symbol periods and search space of $|\mathcal{A}|$ symbols, while the OSTBC-4 has decoding delay of four symbol periods and search space of $|\mathcal{A}|$ symbols. In the 1-Sparse code with four transmit antennas, the ML search space is $4|\mathcal{A}|$ symbols and the decoding delay is 1 symbol period.

The following is a summary of the processing steps for generating, transmitting and detecting the sparse codes for x ∈ C(s, Ψ, $\mathcal{A}$):

1. For a given sparsity index s=1, 2, ..., n, list all possible vectors, each having s ones and (n−s) zeros. There are $$\frac{n!}{(n-s)!s!}$$

such s-sparse vectors;

2. Select words from alphabet $\mathcal{A}$ and construct all unique permutations by putting the words in the non-zero positions of s-sparse vectors from step 1. There are $$\frac{n!}{(n-s)!s!}|\mathcal{A}|^s$$

many s-sparse code vectors denoted by x;

3. Use the basis matrix Ψ to construct f using Eq. (1);
4. Transmit f through the wireless channel by radiating energy from antennas corresponding to the non-zero elements in f;
5. Measure signal across all receive antennas to form observation y;

6. Use maximum likelihood test to detect x from y.

Figure 6:
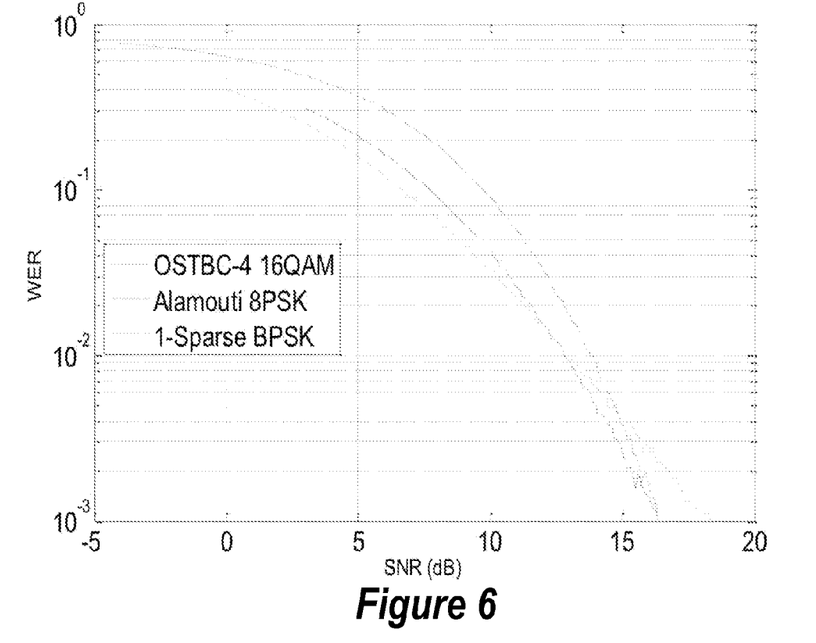
FIG. 6 is a graphical illustration of the word error rate (WER) performance of codes with a spectral efficiency of three bits per Hertz.

Performance of the sparse codes has been estimated using simulation in terms of raw word error rates and compared to the performance of OSTBC-4 and Alamouti codes. Since all three codes have different information rates, a fair comparison requires selecting an appropriate constellation for each coding scheme so that the spectral efficiency is the same for all. The information rate for the Alamouti code and OSTBC-4 is $\log_2|\mathcal{A}|$ and $$\frac{3}{4}\log_2|\mathcal{A}|$$

bits per successful transmission, respectively. On the other hand, the 1-Sparse code has an information rate of $(2+\log_2(|\mathcal{A}|))$ bits per successful transmission. (The extra 2 bits coming from the uncertainty in the position of non-zero element of x(1).) Therefore, in FIG. 6 OSTBC-4, Alamouti code, and 1-Sparse code using 16 QAM, 8 PSK and BPSK, respectively have a spectral efficiency of 3 bits/s/Hz. It can be observed that 1-Sparse code performs better in the range of 0 to 12 dB. As can be seen from the performance curves, the 3 bit 1-sparse code outperforms a 3-bit Alamouti code and a 3-bit OSTBC code in the mid-SNR region.

Figure 7:
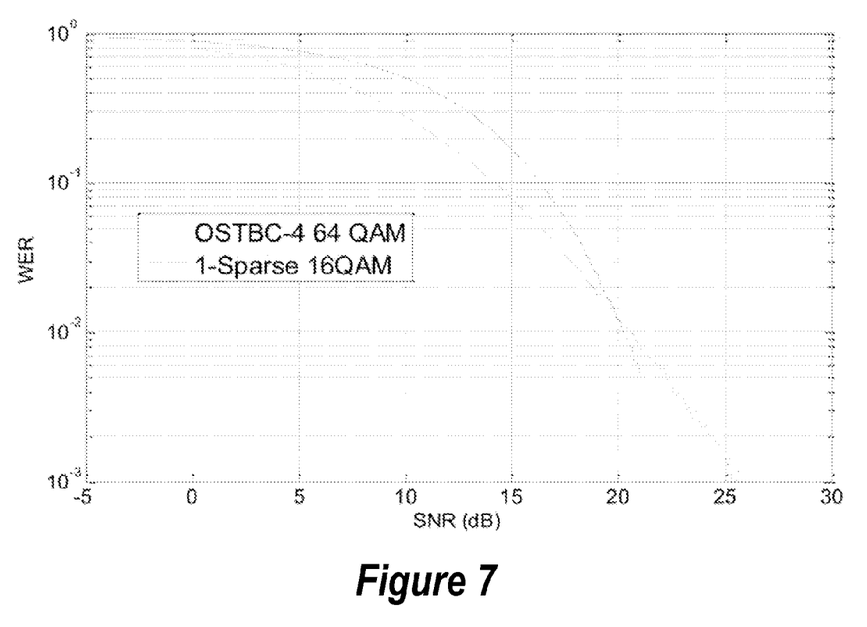
FIG. 7 is a graphical illustration of the word error rate performance for a 1-sparse code comprising six bits/s/Hz and an OSTBC-4 of 4.5 bits/s/Hz.
Figure 8:
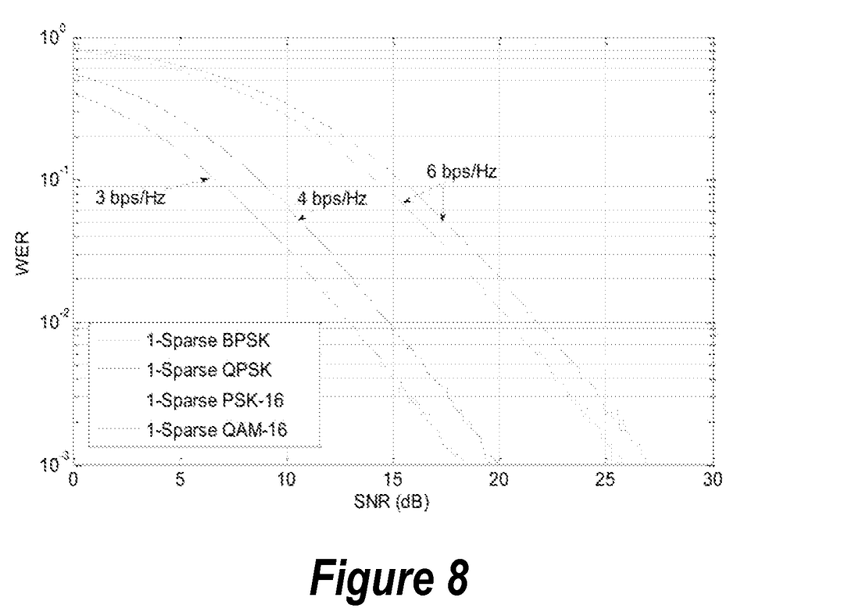
FIG. 8 is a graphical illustration of the word error rate performance for a 1-sparse code with different spectral efficiencies.

FIG. 7 is a graphical illustration of the word error rate performance for a 1-sparse code comprising six bits/s/Hz and an OSTBC-4 of 4.5 bits/s/Hz. As can be seen in FIG. 7, the 1-Sparse code of a higher spectral efficiency than OSTBC-4 also has a better WER performance up to 20 dB SNR. Similarly, in FIG. 8, the WER performance for a 1-sparse code with different spectral efficiencies is shown.

The sparse-code embodiment discussed hereinabove is based on the following assumptions:
1. The channel state information (CSI) assumption is as follows. The receiver has knowledge of the channel, H, and the transmitter has no knowledge of H.
2. Channel H exhibits no multipath.
3. The system comprises a single transmitter and single receiver.
4. The channel is complex Gaussian, independent block fading.
5. The received signal is corrupted by additive white Gaussian noise.
6. Timing errors, frequency offsets, nonlinearities, quantization, Doppler effects, and channel correlation, among other things, are not modeled.

The signal model used in various embodiment of the disclosure in based on the relationship shown below in equation (8).

$$y = H\Psi x + n \quad (8)$$

If the representation matrix, $\Psi$, is the identity, then the signal model simplifies to the form given in Equation 9.

$$y = Hx + n \quad (9)$$

x is an N element vector containing s non-zero elements, that is, x is an s-sparse element of $C^N$. Where C is the set of complex numbers.

The baseline example for this study so far has been with s=1 nonzero element in x, N=4 transmit antennas and M=2 receive antennas. In the baseline case, H has 4 columns, each column holding two complex numbers. The first column is denoted as $h_1$, the second as $h_2$, the third as $h_3$, and the fourth as $h_4$. The nonzero element of "x" is at position "i" and has value "q," where "q" is selected from the set $\Omega q$.

The sparse code detector 518 in the receiver 514 is provided N, M, H, $\Omega q$, and S. The detector is to provide the output position i and symbol q. The cardinality of $\Omega q$ is $L\Omega q$, the number of positions is N. The number of different x vectors is then $L\Omega q*N$. This set of x vectors is called $\Omega x$.

In one embodiment of the disclosure a Maximum Likelihood or "ML" detector is used to generate estimates of the position "i" and the symbol "q." The ML detector predicts a candidate noiseless received vector for each possible "x," with the set of these candidates being referred to as $\Omega y$. There is one candidate "y" for one candidate "x," so the size of $\Omega y$ is the same as the size of $\Omega x$. The ML detector exhaustively searches through $\Omega y$ to find that candidate which is closest to the received data vector y. The term closest means in an L2, or 2-norm, sense. When the closest candidate is found, the detector outputs the corresponding candidate x vector, which will have an estimate of the symbol q at position i (the other elements of x being 0 for the S=1 case).

Results generated using ML detectors show that, for a 4×2 code, the detector can use the value of s as side information and the detector can be of the "basis pursuit" type. Furthermore, the $\Psi$ matrix could be the identity matrix with no loss in performance.

Basis Pursuit is a technique wherein a detector represents "y" in a predetermined basis, such as the columns of the matrix H. The following is a summary of the steps implemented in basis pursuit:
1. Set r0=y
2. Set $\Omega H0$=columns of H={$h_1, h_2, h_3, h_4$}.
3. At iteration i, compare ri with each of the elements of $\Omega Hi$ by computing the inner products dj=<ri, ($\Omega Hi$)j> where ($\Omega Hi$) j denotes the jth element of the set $\Omega Hi$, Ji==arg max dj.
4. Augment the representation of y with the pair dJi, Ji.
5. Create $\Omega Hi+1$ by removing the vector ($\Omega Hi$)j from the set ($\Omega Hi$).
6. Compute a new residual ri+1=ri−dJi*($\Omega Hi$)j.
7. Return to step 3 unless the representation of y is adequate or the number of found vectors is equal to S.

In this embodiment, only a single vector is sought. However, it is possible that the Basis Pursuit steps discussed above will result in selection the wrong single vector because of noise. In that case, a "runner-up" approach can be implemented for s=1 by implementing steps 1, 2, 3, 4, 5 and 7 (no step 6) on a first pass and then implementing steps 3, and 4 on a second pass. Thus, the secondary vector (which would be "primary" if not for noise) can be found by conducting two iterations.

In the second iteration, the processing steps reduce the set $\Omega Hi$ (as before) before going to iteration i' but leaving the residual unchanged (that is, ri'=ri). In this way the "primary vector" is removed as a choice and the detector generates the secondary vector as the output. These two vectors are then compared by slicing (ie, conducting an ML search for which point is closest to) dJi and dJi' against the elements of $\Omega q$, remodulating the vectors $h_{Ji}$ and $h_{Ji'}$ with the respective slicer results (i.e., $q_{1(Ji)}$ and $q_{1(Ji')}$, where 1(k) is the index into $\Omega q$ selected based on soft input dk) and comparing the resulting y candidates (ie $q_{1(Ji)}h_{Ji}$ and $q_{1(Ji')}h_{Ji'}$) with the observed, noisy, "y." The indices of q and of h of the remodulated vector which is closer in an L2 sense to y provide the output of the extended Basis Pursuit algorithm, which we call Basis Pursuit Runner Up. For the 4×2 QPSK case, the index of q provides 2 bits of information, and the index of h provides 2 bits of information, for a total of 4 bits.

An example of the use of Lasso in user signal detection is described in H. Zhu and G. Giannakis, "Sparsity-Embracing Multiuser Detector for CDMA Systems with Low Activity Factor," IEEE ISIT, 2009, pp. 164-168, particularly pg. 166. From the foregoing reference, it was determined that basis pursuit may sometimes compress or eliminate from the solved basis at iteration i a primary vector which is close to a secondary vector at iteration i. Because of this elimination of the primary vector, the secondary vector no longer has a strong inner product with the remaining residual, ri+1.

The following is a summary of the steps for implementing the Basis Pursuit with "runner-up" as described above.

1. Set r0=y
2. ΩH0=columns of H={$h_1$, $h_2$, $h_3$, $h_4$}.
3. At iteration i, compare ri with each of the elements of ΩHi by computing the inner products dj=<ri, (ΩHi)j> where (ΩHi)j denotes the jth element of the set ΩHi. Ji=arg max dj.
4. Perform an exhaustive search within Ωq to see which element is closest to dJi, denote the closest element $q_{1(Ji)}$.
5. Create ΩHi' by removing the vector (ΩHi)j from the set (ΩHi).
6. Compare ri (this is the same value as used in step 3) with each of the elements of ΩHi' by computing the inner products dj'=<ri, (ΩHi')j> where (ΩHi')j denotes the jth element of the set ΩHi'. Ji'=arg max dj.
7. Perform an exhaustive search within Ωq to see which element is closest to dJi', denote the closest element $q_{1(Ji')}$.
8. Remodulation. Compute $q_{1(Ji)}h_{Ji}$ and $q_{1(Ji')}h_{Ji}'$, and see which is closest to ri. If the first, output $q_{1(Ji)}$ and Ji; if the latter, output $q_{1(Ji')}$ and Ji'. Denote the winning column index Ji_winner.
9. Create ΩHi+1 by removing the vector (ΩHi)Ji_winner from the set (ΩHi).
10. Compute a new residual ri+1=ri−q(1(Ji_winner))* (ΩHi)Ji_winner.
11. Return to step 3 unless the representation of y is adequate or the number of found vectors is equal to S.

Figure 9:
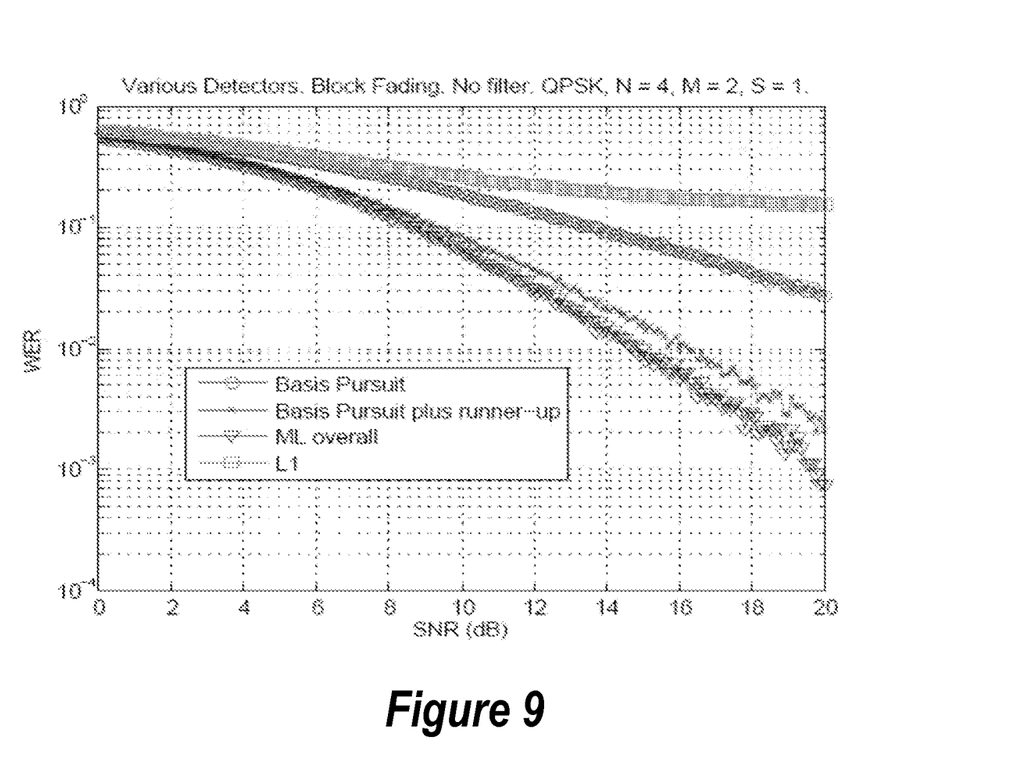
FIG. 9 is a graphical illustration of word error rate versus signal-to-noise ratio for a plurality of detectors in a baseline case with 20,000 words per point in 0.1 dB steps.

For s=1, the processing is complete after step 8. FIG. 9 is a graphical illustration of the word error rate performance of ML, Basis Pursuit, and Basis Pursuit plus runner up detectors described herein.

Various embodiments of the disclosure may be implemented using the computer code in Code Set 1 and Code Set 2 below which by this reference are incorporated herein for all purposes.

Code Set 1 Basis Pursuit Matlab Code

```
function [b,x _hat] = basis_pursuit_October(y,H,S)
% equations 27-29 of Berger's "Signal Extraction..."
[M,N] = size(H);
b = zeros(N,1);
Iselected = zeros(N,1);
Inotselected = ones(N,1);
Number_i_sofar = 0;
x_hat = zeros(N,1);
r_zero = y;
ak = zeros(N,1); %this dummy vector holds the candidate for matching
with the residual received vector
rpast = r_zero;
A_iloop = [ ];
indices = [ ];
amplitudes = [ ];
for iloop = 1:min(S,M)
    % search for next position index
    max_so_far = 0;
    best_k = −1;
    for k=1:N
        if Inotselected (k)==1
            ak = H(:,k);
            denom = ak'*ak;
            num = (abs(ak'*rpast))^2;
            ratio = num/denom;
            if ratio> max_so_far
                max_so_far = ratio;
                best_k = k;
            end
        end
    end
    Iselected(best_k) = 1;
    Inotselected(best_k) = 0;
    indices = [indices; best_k];
    Number_i_sofar = Number_i_sofar+1;
    % update A_iloop
    A_iloop = [A_iloop H(:,best_k)];
    % estimate the amplitude at that position
    x_soft = inv(A_iloop'*A_iloop)*A_iloop'*y;
    % update r_iloop
    r_iloop = r_zero − A_iloop*x_soft;
    rpast = r_iloop;
end
amplitudes = x_soft;
b = indices;
x_hat = amplitudes;
```

Code Set 2 Basis Pursuit Runner Up Matlab Code

```
function [position_index,constellation_index] =
basis_pursuit_October_alternative(y,H,S,Omega)
% equations 27-29 of Berger's "Signal Extraction..."
[M,N] = size(H);
b = [ ];
Iselected = zeros (N,1);
Inotselected = ones(N,1);
Number_i_sofar = 0;
x_hat = zeros(N,1);
r_zero = y;
ak = zeros (N,1); %this dummy vector holds the candidate for matching
with the residual received vector
rpast = r_zero;
A_iloop = [ ];
indices = [ ];
amplitudes = [ ];
for outer = 1:2
    for iloop = 1:min(S,M)
        % search for next position index
        max_so_far = 0;
        best_k = −1;
        for k=1:N
            if Inotselected(k)==1
                ak = H(:,k);
                denom = ak' *ak;
                num = (abs(ak'*rpast))^2;
                ratio = num/denom;
                if ratio> max_so_far
                    max_so_far = ratio;
                    best_k = k;
                end
            end
        end
        Iselected(best_k) = 1;
        Inotselected(best_k) = 0;
        indices = [indices; best_k];
        Number_i_sofar = Number_i_sofar+1;
        % update A_iloop
        A_iloop = [A_iloop H(:,best_k)];
        % estimate the amplitude at that position
        x_soft = inv(A_iloop'*A_iloop)*A_iloop'*y;
        % set A_iloop back down
        A_iloop = [ ];
        % update r_iloop
        if 0
```

-continued

Code Set 2 Basis Pursuit Runner Up Matlab Code

```
            r_iloop = r_zero − A_iloop*x_soft;
            rpast = r_iloop;
        end
        amplitudes = [amplitudes; x_soft];
    end
    b = indices;
    x_hat = amplitudes;
end
epower = [ ];
candidate_indices = [ ];
for outer=1:2
    best = −1;
                min_d = 1000;
                for q = 1:size(Omega)
                    dray = x_hat(outer)−Omega (q);
                    d = dray'*dray;
                    if d<min_d
                        min_d = d;
                        best = q;
                    end
                end
                candidate_indices = [candidate_indices; best] ;
                y_guess = H(:,b(outer))*Omega(best);
                y_ray = y−y_guess;
                epower = [epower; y_ray'*y_ray];
end
[minpower bestindex] = min(epower);
position_index = b(bestindex);
constellation_index = candidate_indices(bestindex);
return;
```

In summary, based on the principles of compressive sampling a new class of block code with sparse structure is proposed for multiple input multiple output (MIMO) channels that has more number of transmit antennas than receive antennas. A sparse code is a vector of the size of number of transmit-antennas. It has very few non-zero elements that belong to a finite set of alphabets. The received signal is linear combinations of the columns of MIMO channel matrix perturbed by noise. Using the received signal, a sparse-code-detector needs to detect the non-zero alphabets and the positions of the alphabets in the transmitted sparse vector. Such a recovery may seem impossible for an underdetermined MIMO channel, where the receiver space is smaller than the transmitter space. However, a key insight into the design of sparse codes comes from compressive sampling (CS) theory which states that sub-Nyquist samples from a sparse signal are sufficient to perfectly reconstruct the original sparse signal with an overwhelming probability. Further, CS reconstruction requires the sampler to be incoherent to the basis of the original sparse signal. It is to be noted that random Gaussian wireless channels are incoherent to any orthonormal basis. Therefore, it is possible to associate the underdetermined MIMO channel to a sub-Nyquist sampler of the transmitted sparse code, and invoke the CS theory for designing sparse-code-detectors.

An s-sparse codebook is defined by a collection of sparse code vectors each of the length of number of transmit antennas n, and each having s number of non-zero elements. We note that there is $$\binom{n}{s}$$

possibilities of uniquely positioning s non-zero elements in a vector of size n. Further, the s non-zero elements of each sparse vector are taken from a set with q unique alphabets. Clearly, we can form $q^s$ number of unique combinations of s-tuples from the alphabet set. Therefore, the total number of code words in the s-sparse codebook is given by the product $$\binom{n}{s}q^s.$$

In this sense, sparsity has increased information content per code by inserting uncertainty in the position of non-zero elements of the code. For example, a 1-sparse codebook using QPSK alphabets for a 4 transmit antennas system has the following sixteen 1-sparse codewords:

$$\left\{ \begin{pmatrix} \pm e^{\pm j\frac{\pi}{4}} \\ 0 \\ 0 \\ 0 \end{pmatrix}, \begin{pmatrix} 0 \\ \pm e^{\pm j\frac{\pi}{4}} \\ 0 \\ 0 \end{pmatrix}, \begin{pmatrix} 0 \\ 0 \\ \pm e^{\pm j\frac{\pi}{4}} \\ 0 \end{pmatrix}, \begin{pmatrix} 0 \\ 0 \\ 0 \\ \pm e^{\pm j\frac{\pi}{4}} \end{pmatrix} \right\}$$

A sparse code detector should not only detect the correct transmitted s-tuple alphabets but also the position of the alphabets in the transmitted code vector. It is possible to evaluate the performance of maximum likelihood detector (MLD) that minimizes the L2 distance metric in the receiver space to select the transmitted codeword. The computational complexity of the MLD for sparse codes is combinatorial. Therefore, it is possible to implement an alternative detector called basis pursuit detector (BPD) that exploits sparse structure of codes to make a detection decision. Although the BPD has a linear computational complexity, in presence of noise its performance is severely degraded compared to the MLD. Motivated by this, we design a basis pursuit plus runner-up detector (BRD) that has MLD-like performance with BPD-like computational complexity. By allowing a runner-up column, the BRD detector avoids detection failures even in situations when a non-transmitted column of channel matrix is highly correlated to noise.

Although the described exemplary embodiments disclosed herein are described with reference to managing hidden node interference, the present disclosure is not necessarily limited to the example embodiments which illustrate inventive aspects of the present disclosure that are applicable to a wide variety of authentication algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:
1. A communication method comprising:
    receiving a complex vector, y, corresponding to a transmitted sparse-space codeword, at M receive antennas;
    processing the received complex vector and a plurality of candidate received sparse-space codewords, wherein the processing comprises:

constructing a set of candidate transmit sparse-space code words by permuting over all possible combinations of S constellation symbols paired with all known S-sparse vectors of lenght N;

computing a location of said received vector in a complex space of dimension M; and computing a distance between the location of said received complex vector and a location of each candidate received sparse-space codeword in said complex space.

2. The method of claim 1, wherein the positions of non-zero elements in each known S-sparse vector are occupied by each possible combination; generating the set of candidate received sparse-space codewords by mapping the set of candidate transmit codewords using a channel estimation matrix.

3. The method of claim 1 wherein the processing of said complex vector codeword comprises: generating matrix data corresponding to a MxN channel estimate matrix, where M corresponds to the number of receive antennas and N corresponds to the number of transmit antennas.

4. The method of claim 3, further comprising:
normalizing each of the candidates;
computing inner product of the received codeword with each normalized candidate;
ranking the inner products by magnitude from largest to smallest;
identifying a non-zero position in the transmit codeword as the index of a normalized candidate which yielded the highest ranking inner product;
augmenting an estimated basis with the column, h, of the channel estimation matrix producing the highest ranking;
using the basis to estimate a complex scalar associated with the identified column h; and
comparing the complex scalar with all possible constellation symbols to identify a selected constellation symbol, x.

5. The method of claim 4, further comprising:
forming a new working value y by subtracting h times x from the present working value y;
operating on y to identify a column of the channel estimation matrix other than h with which to augment the basis; and
operating on y with the augmented basis to identify a second selected constellation symbol.

6. The method of claim 4, further comprising:
identifying a non-zero position in the transmit codeword as the index of the runner-up column which yielded the second highest ranking;
augmenting an estimated basis with the runner-up column;
using the basis to estimate a complex scalar associated with the runner-up column; and
comparing the complex scalar with all possible constellation symbols to identify a runner-up constellation symbol.

7. A communication device comprising:
processing logic configured to:
receive a complex vector, y, corresponding to a transmitted sparse-space codeword, at M receive antennas;
process the received complex vector and a plurality of candidate received sparse-space codewords, wherein the processing comprises:
constructing a set of candidate transmit sparse-space code words by permuting over all possible combinations of S constellation symbols paired with all known S-spare vectors of length N; and
computing a location of said received vector in a complex space of dimension M and computing a distance between the location of said received complex vector and a location of each candidate received sparse-space codeword in said complex space.

8. The communication device of claim 7, the positions of non-zero elements in each known S-sparse vector are occupied by each possible combination; generating the set of candidate received sparse-spaced codewords by mapping the set of candidate transmit codewords using a channel estimation matrix.

9. The communication device of claim 7 wherein the processing of said complex vector codeword comprises: generating matrix data corresponding to a MxN channel estimate matrix, where M corresponds to the number of transmit antennas and N corresponds to the number receive of antennas.

10. The communication device of claim 9 wherein said processing logic is further configured to:
normalize each of the candidates;
compute inner product of the received codeword with each normalized candidate;
rank the inner products by magnitude from largest to smallest;
identify a non-zero position in the transmit codeword as the index of a normalized candidate which yielded the highest ranking inner product;
augment an estimated basis with the column, h, of the channel estimation matrix producing the highest ranking;
use the basis to estimate a complex scalar associated with the identified column h; and
compare the complex scalar with all possible constellation symbols to identify a selected constellation symbol, x.

11. The communication device of claim 10, wherein said processing logic is further configured to:
generate a new working value y by subtracting h times x from the present working value y;
operate on y to identify a column of the channel estimation matrix other than h with which to augment the basis; and
operate on y with the augmented basis to identify a second selected constellation symbol.

12. The communication device of claim 11, wherein said processing logic is further configured to:
identify a non-zero position in the transmit codeword as the index of the runner-up column which yielded the second highest ranking;
augment an estimated basis with the runner-up column;
use the basis to estimate a complex scalar associated with the runner-up column; and
compare the complex scalar with all possible constellation symbols to identify a runner-up constellation symbol.

\* \* \* \* \*